G. G. EARL & C. A. BROWN.
HYDRAULIC APPARATUS.
APPLICATION FILED JULY 5, 1916.

1,267,522.

Patented May 28, 1918.
3 SHEETS—SHEET 1.

Inventors:
George G. Earl and
Chas. A. Brown
by J. O. Richey
Their Atty.

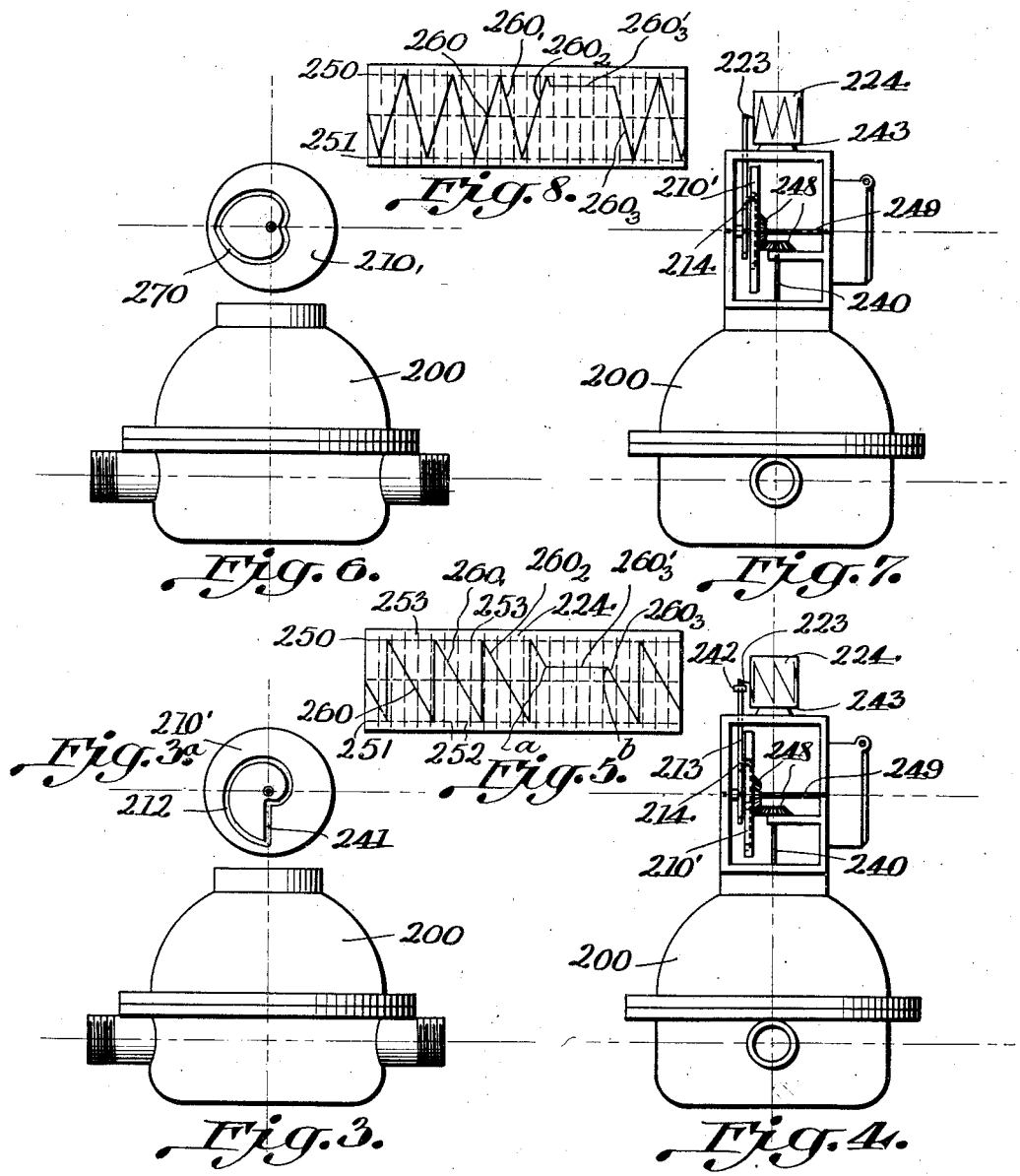

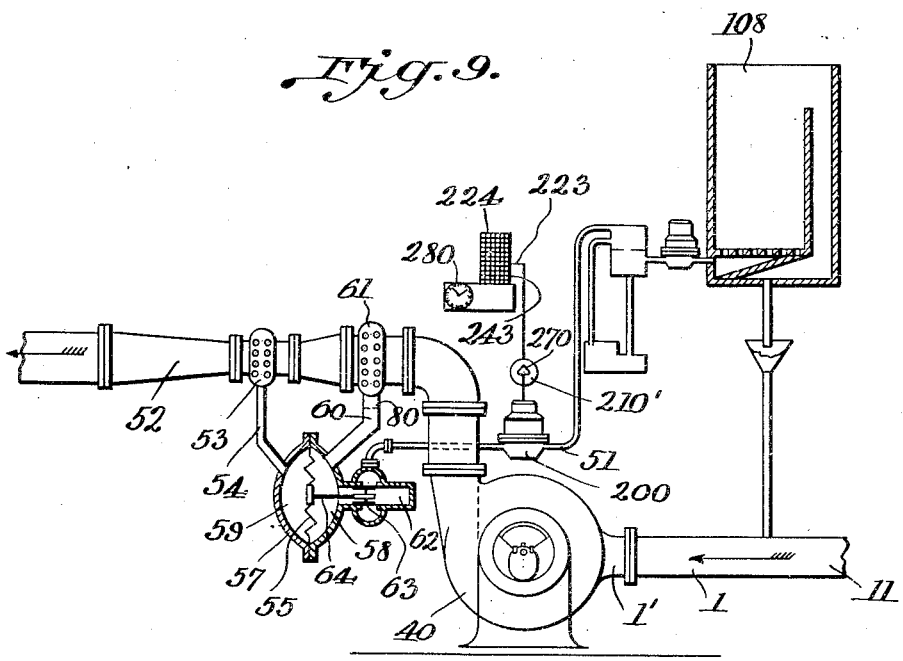

UNITED STATES PATENT OFFICE.

GEORGE GOODELL EARL, OF NEW ORLEANS, LOUISIANA, AND CHARLES ARTHUR BROWN, OF LORAIN, OHIO, ASSIGNORS OF ONE-THIRD TO ALBERT BALDWIN WOOD, OF NEW ORLEANS, LOUISIANA.

HYDRAULIC APPARATUS.

1,267,522.      Specification of Letters Patent.      Patented May 28, 1918.

Original application filed January 13, 1913, Serial No. 741,637. Divided and this application filed July 5, 1916. Serial No. 107,524.

*To all whom it may concern:*

Be it known that we, GEORGE G. EARL, a citizen of the United States, residing at New Orleans, in the parish of Orleans and State of Louisiana, and CHARLES A. BROWN, a citizen of the United States, residing at Lorain, in the county of Lorain and State of Ohio, have invented certain new and useful Improvements in Hydraulic Apparatus; and we do hereby declare the following to be a full, clear, and exact description of the invention, such as will enable others skilled in the art to which it appertains to make and use the same.

This application is a division of our application S. N. 741,637, filed Jan. 13, 1913.

The object of our invention disclosed in this application is to provide means for integrating and recording fluid flows in such a manner as to indicate at any time the quantity of fluid which has flowed past a given point during a given time. We also aim to indicate the rate of flow at any particular time. We also aim to provide apparatus which will accomplish these objects and which can be placed at any desired location, simply and cheaply, and without the use of complicated means.

Other objects of our invention and the invention itself will probably be better understood from a detailed description of embodiments of the invention.

Fig. 3 is an elevation of the meter.

Figure 1:
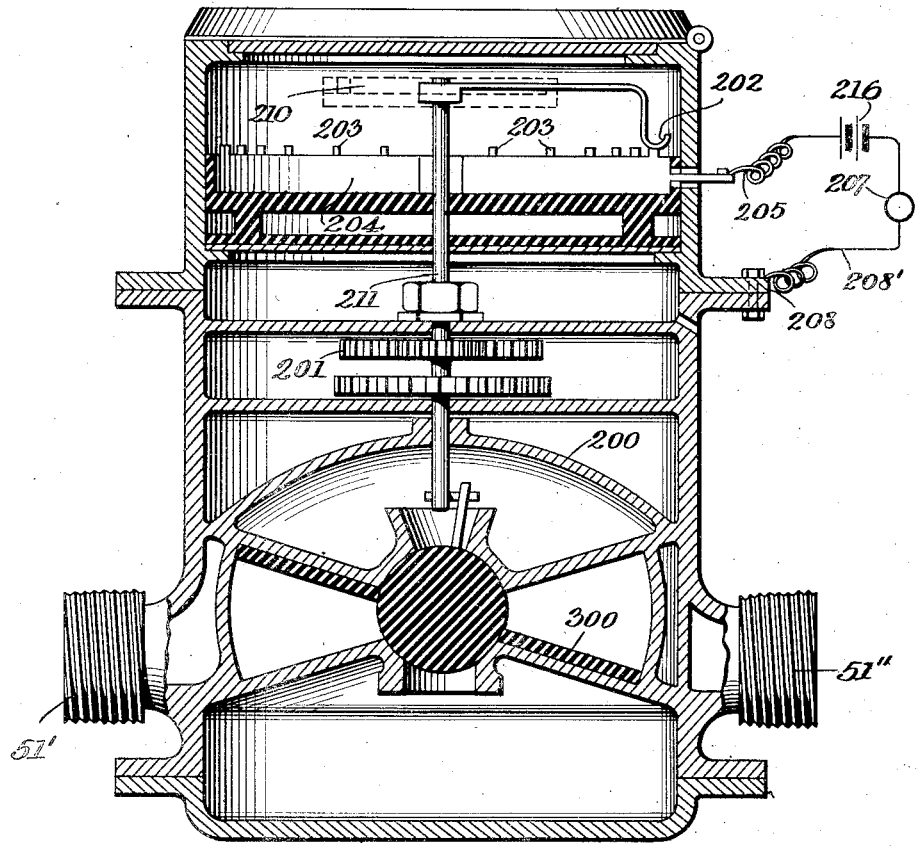
Figure 1 is a section through one form of meter and an embodiment of our invention.

Fig. 3ª shows the member 210 in another position.

Fig. 4 is an end elevation of the meter shown in Fig. 3, showing an end elevation of means which may be employed to operate the member 210 through the meter.

Fig. 5 is an enlarged view of a chart made upon the drum shown in Fig. 4.

Figs. 6 and 7 are views of a modification showing the form of cam illustrated in Fig. 9.

Fig. 8 is a view of a chart which is to be made by the modification shown in Figs. 6 and 7.

Fig. 9 illustrates one form of apparatus for creating a functional flow which may be employed to operate the apparatus shown in any of the embodiments of the invention illustrated.

Referring now to the drawings and to the embodiments illustrated therein, at 200 is shown a meter of any suitable form, here illustrated as a disk meter. The meter itself constitutes no part of our invention, and any suitable form for measuring fluid may be used. Fluid enters at 51' and passes through the meter, operating the disk 300, and out at 51". The meter actuates, through a suitable train of gears, shown at 201, an electric contact 202 which moves over a plurality of stationary electric contacts 203 mounted upon a base 204. These contacts are connected to a conductor 205 which is connected through a source 216 with an electro-responsive device 207, which may be used to bring about any desired mechanical operation. The other terminal of the device 207 is grounded, through a conductor 208', to the frame 208 of the apparatus which is called, for convenience, a periodicimeter.

It will be seen that for every unit or fixed quantity of flow through the meter, the contact 202 will be caused to engage one of the contacts 203 which are equi-distant apart, thereby closing the circuit and operating the device 207. A support 210 is also rotated by the shaft 211 and this support may be provided with a cam-shaped groove. This form of the apparatus, however, is illustrated more in detail in Figs. 2 and 8.

Figure 2:
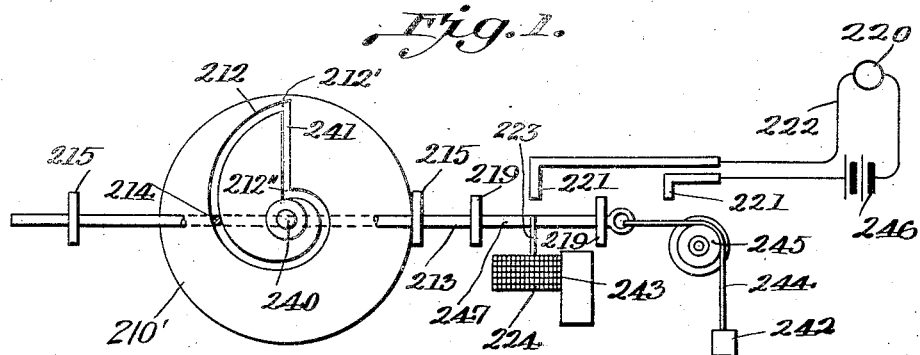
Fig. 2 is an elevation of a modification of the embodiment shown in Fig. 1.

In Fig. 2 a disk is shown at 210' which is rotated through a shaft 240 by a meter, such as shown at 300. The disk 210' is provided with a cam, here shown as a groove 212. In the embodiment illustrated in Figs. 2, 3ª and 4 this groove is a spiral whose ends 212' and 212" are connected by a straight slot 241. A marker, such as a pen 223, is controlled by this cam. In the form illustrated the pen is connected to a rod 213, bearing a pin 214 which operates in the slot 212. Bearings, illustrated at 215, may be provided for the rod 213. The device 223 operates to make a record upon a sheet 224, which is mounted upon a drum 243 rotated preferably at a uniform velocity. Means are provided for returning the apparatus to the initial point when a cycle has been completed. This is here shown as a weight 242 connected to a cord 244 which passes over a pulley 245 and is connected to one end of the rod 213. Thus, when the pin 214 reaches the end 212' of the cam, the slot 241 will be horizontal and through the action of the weight 242 the apparatus will be returned to normal with the pin 214 in the end 212'' of the spiral groove.

In addition to the operation of the device 223, we provide means for operating an electro-responsive device 220, which may be an electrically-operated pen operating on a sheet carried by a constantly rotating drum, such as shown at 224. In the form shown in Fig. 2 the rod 213 is provided with a pair of contacts 219 which are connected by an electric conductor. The device 220 is connected in a circuit 222, which includes a source of current 246 and a pair of terminals 221. Through each cycle of the device, the contacts 221 will be bridged by the contacts 219 and the inter-connecting member, here shown as a portion of the rod 247.

In Fig. 4 we have illustrated in detail means for communicating motion from the meter to the member 210' comprising a shaft 240 and a pair of bevel gears 248, one of which is mounted on the shaft 240 and the other upon a shaft 249. In the embodiment shown in Fig. 4 the rod 213 works vertically and the weight 242 is mounted directly on the rod. Of course, the rod may be heavy enough to return to normal without the addition of a weight.

An enlarged view of the chart with the record upon the same is shown in Fig. 5. The chart shows two parallel lines, 250 and 251, which will be spoken of as abscissas, here shown parallel to the upper and lower edges of the chart itself. The abscissas are divided into equal spaces 252 by ordinates 253, which, in the form shown, are drawn perpendicularly to the abscissas. The spaces 252 indicate equal periods of time. The ordinates are divided up to indicate equal quantities of flow past a given point, such as through the meter. These divisions are preferably decimal parts of the space between the abscissas.

When the device is in operation, the pen will start from the abscissa 250 in a curve whose inclination to either of the ordinates will vary according to the rate of flow, and will continue to the abscissa 251, arriving there only after a definite amount of fluid has passed the meter. It will then return instantaneously on a straight line parallel to the ordinate back to the abcissa 250 and will begin another curve as before. These curves are shown at 260, $260_1$, $260_2$ and $260_3$.

It may be noted that the portion of the curve $260_3$, shown at $260_3'$ parallel to the abscissa indicates no flow in the period of time between the point $a$ and the point $b$. The quantity of fluid which has flowed through the meter between any two points of time may be found by counting the units on the ordinates through which the pen has passed during such time. The rate of flow at any time may be determined by taking the tangent to the curve at that point of time, which is found upon the abscissa. It will thus be seen that both the quantity of fluid which has passed the meter and the rate of flow at any time may be determined without removing the chart from the apparatus, or disturbing the operation of the apparatus.

In the embodiment shown in Figs. 6 to 8 we have employed a double spiral or heart-shaped cam, such as is illustrated at 270 in Fig. 9. This cam is preferably made in the shape of a groove in the disk 210' and operates the pen 223 through the bevels 248 and the shafts 240 and 249. In this embodiment the pen will not be returned on a straight line to the abscissa from which it started, but will immediately, upon touching one of the abscissas, start a new curve on the back motion. Instead of making what might be termed in general an N-shaped line, as in Fig. 5, it will make a W-shaped line, as illustrated in Fig. 8, each of the strokes being a curve of one form or another. Each full up stroke or down stroke indicates a definite amount of flow, and each fraction of such stroke indicates that fraction of that amount of flow.

It will be understood that the meter may be either connected to the main flow or to a flow which is functional to the main flow. In Fig. 9 we have shown diagrammatically apparatus for creating a functional flow. The conduit through which the main flow passes is shown at 1. Means are provided for causing the fluid to flow through 1, such as a pump 40. The main flow passes through a venturi 52 at the throat 53 of which a duct 54 is connected and leads to a fluid chamber 57. A second duct 60 connected to said chamber leads to the full section of the conduit 1 at 61. At 80 is shown diagrammatically an orifice in the duct 60 for regulating the proportion of the flow therethrough. The meter 200 is shown connected in the duct 51 which is connected to the chamber 57. At 63 is shown a valve which controls the flow of fluid through the duct 51. The valve is connected by a stem 64 to a diaphragm 55 in the chamber 57, dividing the same into cells 59 and 58, the ducts 51 and 60 communicating with the cell 58 and the duct 54 with the cell 59. The duct 51 in the form shown leads through other apparatus, which is indicated on the drawing and discharges into the tank 108.

The apparatus illustrated in Fig. 9 will operate, in the manner set forth in the parent application, to create in the duct 51 a flow of fluid proportional to the flow through the conduit 1. The flow through the duct 51 will operate the meter 200, which through the cam 270 on the disk 210' will actuate the pen 223 to make the curves upon the chart 224, which is mounted upon the drum 243 operated by the clock work 280, in the manner which has been described in detail, especially in connection with Figs. 6 to 8 inclusive.

While we have shown spiral cams, it will be understood that we may use any convenient means for converting the rotary motion of the meter into the rectilinear motion of the pen. We have shown in Figs. 5 to 8 charts employing rectilinear coördinates, though we may use any suitable coördinates without departing from the scope of our invention. We may also employ any suitable means for driving the drum, and any suitable pen or pencil. While we have shown a drum, it will be understood that we may employ any suitable means for moving the chart before the pen or pencil.

We have, in fact, shown these particular details and these particular embodiments for the purpose of better illustrating our invention, and not that we desire to be limited to such details and embodiments. Many departures may be made from both the details and embodiments shown without departing from the spirit of the invention.

We claim:—

1. In fluid measuring apparatus, the combination of a chart provided with two lines parallel to each other, means to move said chart, a duct through which fluid flows and apparatus operated by the flow of fluid in the duct including a pen to trace curves on said chart back and forth between said parallel lines, each curve indicating the same quantity of fluid flowing through said duct.

2. In fluid measuring apparatus, the combination of a fluid conduit through which fluid flows, a pen, a chart provided with two parallel lines always equi-distant apart, means to move said chart past the point of said pen at a constant velocity and means controlled by the flow of fluid in the duct to move said pen across said chart from one of said lines to the other in straight line motion and to reverse the movement of said pen when a definite amount of fluid has flowed past a point in said conduit.

In witness whereof, we have hereunto affixed our signatures this 3rd day of June, 1916.

GEORGE GOODELL EARL.
CHARLES ARTHUR BROWN.